(12) United States Patent
Lee et al.

(10) Patent No.: US 10,536,388 B2
(45) Date of Patent: Jan. 14, 2020

(54) APPARATUS FOR SCHEDULING CONTENTION-BASED DATA TRANSFER AND METHOD THEREOF

(71) Applicant: RESEARCH & BUSINESS FOUNDATION SUNGKYUNKWAN UNIVERSITY, Suwon-si (KR)

(72) Inventors: Tae-Jin Lee, Suwon-si (KR); Youngil Cho, Seoul (KR); Ji Hyoung Ahn, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 26 days.

(21) Appl. No.: 15/856,630

(22) Filed: Dec. 28, 2017

(65) Prior Publication Data

US 2018/0331966 A1 Nov. 15, 2018

(30) Foreign Application Priority Data

May 15, 2017 (KR) ........................ 10-2017-0059992

(51) Int. Cl.
*H04L 12/807* (2013.01)
*H04L 29/08* (2006.01)
(Continued)

(52) U.S. Cl.
CPC ........ *H04L 47/27* (2013.01); *H04L 29/08108* (2013.01); *H04L 69/324* (2013.01);
(Continued)

(58) Field of Classification Search
CPC . H04L 69/324; H04L 47/27; H04L 29/08108; H04W 74/0816; H04W 74/006; H04W 74/0808
See application file for complete search history.

(56) References Cited

U.S. PATENT DOCUMENTS

2005/0064817 A1\* 3/2005 Ginzburg ............ H04W 74/085
455/41.2
2006/0256743 A1\* 11/2006 Lee .................... H04W 74/0816
370/278
(Continued)

FOREIGN PATENT DOCUMENTS

KR 10-2005-0063216 A 6/2005
KR 10-2011-0042589 A 4/2011
KR 10-2013-0087561 A 8/2013

OTHER PUBLICATIONS

Cho, Y. et al., "Self-initiated Auto-scheduling Method for Energy Harvesting Nodes with AP Assistance," The winter conference of the Korean Institute of Communication and Information Science in 2017, College of Information and Communication Engineering, Sungkyunkwan University, Jan. 18, 2017 (1 page in English; 4 pages in Korean).
(Continued)

*Primary Examiner* — Maharishi V Khirodhar
*Assistant Examiner* — Kenneth P Hunt
(74) *Attorney, Agent, or Firm* — NSIP Law

(57) ABSTRACT

Provided are an apparatus and a method for scheduling contention-based data transmission in a network system including an access point (AP) and a plurality of terminals. The method includes determining a contention window (CW) size based on the number of terminals connected to the access point, and transmitting information about the contention window size to any one of the plurality of terminals. The apparatus includes a processor and an RF unit. Here, the processor is configured to determine a contention window (CW) size based on the number of terminals connected to the access point, and transmit information on the contention window size to any one of the plurality of terminals through the RF unit.

23 Claims, 9 Drawing Sheets

(51) Int. Cl.
*H04W 74/08* (2009.01)
*H04W 74/00* (2009.01)
*H04W 28/02* (2009.01)

(52) U.S. Cl.
CPC ..... *H04W 28/0205* (2013.01); *H04W 74/006* (2013.01); *H04W 74/0816* (2013.01); *H04W 74/0808* (2013.01)

(56) References Cited

U.S. PATENT DOCUMENTS

| | | | |
|---|---|---|---|
| 2011/0044303 A1* | 2/2011 | Ji | H04W 74/085 370/338 |
| 2014/0003414 A1* | 1/2014 | Choudhury | H04W 74/006 370/347 |
| 2014/0079016 A1 | 3/2014 | Dai et al. | |
| 2016/0157266 A1* | 6/2016 | Wang | H04W 74/004 370/336 |
| 2017/0171886 A1* | 6/2017 | Nabetani | H04W 74/08 |
| 2018/0167976 A1* | 6/2018 | Wentink | H04W 74/0841 |

OTHER PUBLICATIONS

Luis Sanabria-Russo, et al., "Implementation and Experimental Evaluation of a Collision-Free MAC Protocol for WLANs," *Proceedings of the IEEE International Conference on Communications*, London, UK, Jun. 2015, pp. 1-7.

* cited by examiner

FIG. 4

| Protocol Version | Type | Subtype | To DS | From DF | More Fragments | Re-try | Power Management | More Data | Protected Frame | Order |
|---|---|---|---|---|---|---|---|---|---|---|
| 2 | 2 | 4 | 1 | 1 | 1 | 1 | 1 | 1 | 1 | 1 |

Bits:

311

310

APPARATUS FOR SCHEDULING CONTENTION-BASED DATA TRANSFER AND METHOD THEREOF

CROSS-REFERENCE TO RELATED APPLICATIONS

This application claims priority to Korean Patent Application No. 10-2017-0059992 filed on 15 May 2017 in Korea, the entire contents of which are hereby incorporated by reference in their entirety.

BACKGROUND

1. Technical Field

The present invention relates to data transmission, and more particularly, to a method and apparatus for transmitting data in a contention-based manner.

2. Description of Related Art

In a wireless network environment, a collision is a phenomenon in which signals originating from a plurality of wireless terminals simultaneously arrive at a receiving terminal and cause mutual interference. For normal data transmission, each data need to be retransmitted. This retransmission reduces data throughput, increases latency, and reduces energy use efficiency.

When non-contention-based data transmission in which a coordinator or an Access Point (AP) schedules data transmission of each terminal in consideration of the number of terminals connected to a network is used, data transmission without collision is possible. However, the non-contention-based data transmission has a limitation in that the complexity and cost of the AP and the terminal increase due to an increase of the overhead for data transmission scheduling of all terminals in a high-density and changeable network environment.

Wireless Local Area Network (WLAN) Standard IEEE 802.11 uses Distributed Coordination Function (DCF) based on Carrier Sense Multiple Access with Collision Avoidance (CSMA/CA). In the DCF, each terminal checks whether or not a channel is used before sending data, and if the channel is used, waits until the channel is not used. If the channel is not in use, the terminal sets a random back-off value, decreases the back-off value by 1 when the channel is empty for each time slot, and transmits data when the back-off value reaches zero. In DCF, a binary exponential back-off in which a terminal having failed in data transmission due to a collision reduces the collision probability by doubling the back-off window size is used, and when the data transmission is successful, the back-off window size is initialized to attempt next data transmission. However, this is also just a method for reducing the collision, and cannot completely prevent the collision. Also, there may be a large deviation of response delay due to the random-based back-off contention.

FIG. 1 is a view illustrating an operation of a typical DCF in a network in which a plurality of terminals 20-1, 20-2, 20-3, 20-4, 20-5, and 20-6 are connected to one AP 10. It is assumed that each of the terminals attempts to transmit data to the AP 10. Hereinafter, a case where the terminal 1 20-1, the terminal 2 20-2, and the terminal 3 20-3 attempt to transmit data to the AP 10 will be described as an example. In FIG. 1, R denotes a Ready to Send (RTS) frame indicating a channel occupancy of a transmitting terminal desiring data transmission, and C denotes a Clear to Send (CTS) frame which is a response of a receiving terminal (AP) receiving the RTS frame. D denotes a frame for transmitting actual data of the transmitting terminal, and A denotes an Acknowledgment (ACK) frame indicating that the receiving terminal (AP) has successfully received the data.

The channel state is sensed before data are transmitted, and if the channel is empty during DCF Interframe Space (DIFS), an arbitrarily selected back-off value is decreased for each unit time. Also, the terminal 1 20-1 whose back-off value is earliest reduced to 0 sends an RTS frame to the AP 10 for data transmission. Each of the terminals 20-2 and 20-3 receiving the RTS frame determines that the channel is being used by another terminal, and stops decreasing the back-off and waits until the channel is not used. The AP 10 receives the RTS frame of the terminal 1 20-1, and transmits the CTS frame to receive data from the terminal 1 20-1. When data reception is completed, the AP 10 transmits an ACK frame, and then each of the terminals 20-1, 20-2, and 20-3 detects that the channel is empty for DIFS time and starts decreasing the back-off. When the back-off values are simultaneously reduced to 0 and thus the terminal 2 20-1 and the terminal 3 20-3 simultaneously send the RTS frame to the AP 10, the AP 10 cannot successfully receive the RTS frame and does not transmit the CTS frame due to the collision.

When the time at which CTS is normally received elapses, the terminal 2 20-2 and the terminal 3 20-3 can determine that there is a collision in the RTS frame, and each of the terminals 20-1, 20-2 and 20-3 again checks that the channel is empty during the DIFS time and decreases the remaining back-off value. At this time, if the back-off values reach 0 at the same time, then the terminal 1 20-1 and the terminal 2 20-2 transmit the RTS frame at the same time. In this case, the RTS frame collides in the AP 10, and the above operations are repeated. It can be confirmed through the above example that a specific terminal such as the terminal 2 20-2 can have a considerable response delay.

SUMMARY

Some embodiments of the present invention provides a method for scheduling contention-based data transmission, which allows the terminals themselves to perform data transmission scheduling without collision according to the number of terminals connected to the network in a network environment employing contention-based data transmission, thereby maintaining the transmission delay of each of the terminals constant and performing flexible data transmission according to the energy state.

Some embodiments of the present invention provides an apparatus for scheduling contention-based data transmission, which allows the terminals themselves to perform data transmission scheduling without collision according to the number of terminals connected to the network in a network environment employing contention-based data transmission, thereby maintaining the transmission delay of each of the terminals constant and performing flexible data transmission according to the energy state.

However, the present invention is not limited to the disclosed embodiments, and may be variously extended without departing from the spirit and scope of the invention.

In an aspect, a method for scheduling contention-based data transmission in a network system comprising an access point (AP) and a plurality of terminals is provided. The method includes: determining a contention window (CW) size based on the number of terminals connected to the access point; and transmitting information about the contention window size to any one of the plurality of terminals.

The transmitted information on the contention window size may be used to determine a deterministic back-off value ($B_d$) of any one of the plurality of terminals.

The information on the contention window size may be transmitted through an ACK frame indicating that data are successfully transmitted from any one of the plurality of terminals to the access point.

The ACK frame may include a contention window (CW) field.

The ACK frame may include a frame control field, and a protocol version field comprised in the frame control field may include information indicating that a deterministic back-off value based on the number of terminals is used.

The contention window size may be determined as a positive integer that is a minimum even number greater than or equal to a value obtained by multiplying the number of terminals connected to the access point by a system stabilization constant.

The system stabilization constant may be set to be greater than or equal to 2 for collision avoidance scheduling of all terminals connected to the access point.

The determining of the contention window size based on the number of terminals connected to the access point may include updating the contention window size whenever the number of terminals connected to the access point is changed.

The deterministic back-off value of any one of the plurality of terminals may be determined as a value obtained by dividing the contention window size by 2.

When an energy state of any one of the plurality of terminals is lower than a predetermined threshold, any one of the plurality of terminals may increase a data transmission period by multiplying the deterministic back-off value by a predetermined power saving coefficient.

In another aspect, an apparatus for scheduling contention-based data transmission in a network system comprising an access point (AP) and a plurality of terminals is provided. The apparatus includes a processor and an RF unit. The processor is configured to determine a contention window (CW) size based on the number of terminals connected to the access point, and transmit information on the contention window size to any one of the plurality of terminals through the RF unit.

The transmitted information on the contention window size may be used to determine a deterministic back-off value ($B_d$) of any one of the plurality of terminals.

The information on the contention window size may be transmitted through an ACK frame indicating that data are successfully transmitted from any one of the plurality of terminals to the access point.

The ACK frame may include a contention window (CW) field.

The ACK frame may include a frame control field, and a protocol version field comprised in the frame control field may include information indicating that a deterministic back-off value based on the number of terminals is used.

The contention window size may be determined as a positive integer that is a minimum even number greater than or equal to a value obtained by multiplying the number of terminals connected to the access point by a system stabilization constant.

The system stabilization constant may be set to be greater than or equal to 2 for collision avoidance scheduling of all terminals connected to the access point.

The determining of the contention window size based on the number of terminals connected to the access point may include updating the contention window size whenever the number of terminals connected to the access point is changed.

The apparatus for scheduling contention-based data transmission may be configured as a part of the access point.

In another aspect, a network system for performing contention-based data transmission is provided. The network system includes an access point (AP) and a plurality of terminals. The access point is configured to determine a contention window size based on the number of terminals connected to the access point and transmit information on the contention window size to any one of the plurality of terminals, and any one of the plurality of terminals is configured to determine a deterministic back-off value ($B_d$) of any one of the plurality of terminals based on the transmitted information on the contention window size.

BRIEF DESCRIPTION OF DRAWINGS

FIG. 4 is a view illustrating an exemplary configuration of a frame control field of FIG. 3.

DETAILED DESCRIPTION OF EXAMPLE EMBODIMENTS OF THE INVENTION

Figure 1:
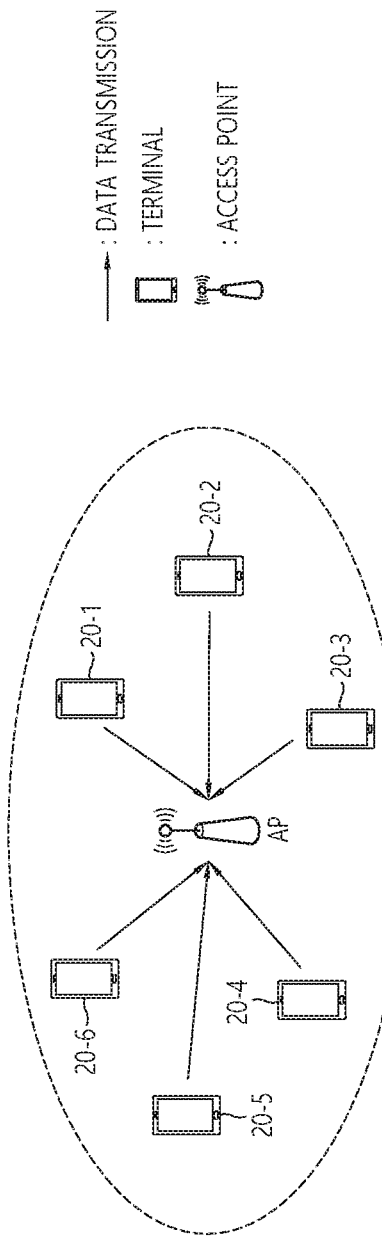
FIG. 1 is a view an operation example of a typical DCF in a network in which a plurality of terminals are connected to one AP.
Figure 1:
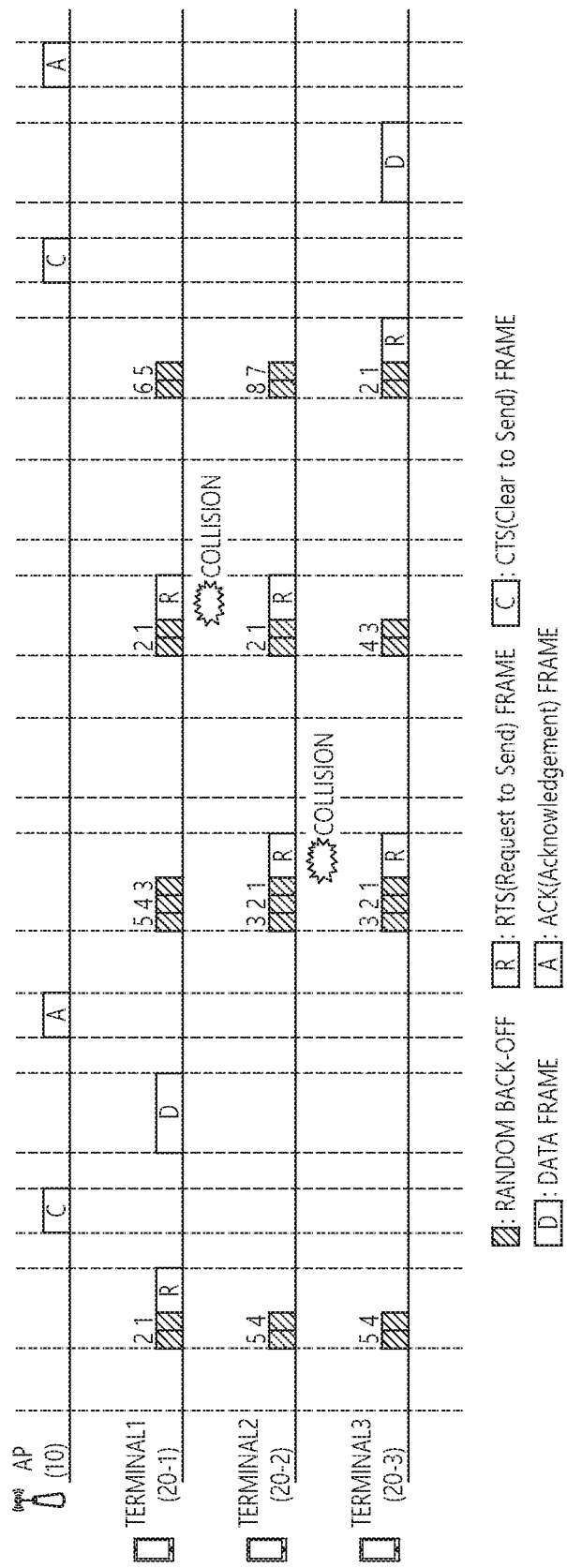

Since the present invention can be modified into various types and can be implemented into various embodiments, specific embodiments will be illustrated in the drawings and described in this disclosure in detail.

However, the present invention is not limited to a specific implementation type, but should be construed as including all modifications, equivalents, and substitutes involved in the spirit and the technical scope of the present invention.

The terms such as "a first/the first" and "a second/the second" may be used to describe various components, but the components should not be limited by the terms. The terms are used only in order to distinguish one component from another component. For example, a first component may be named a second component without deviating from the scope of the present invention, and similarly, the second component may be named the first component. The term "and/or" includes a combination of a plurality of related items or any one of a plurality of related items.

It should be understood that when an element is referred to as being "connected" or "coupled" to another element, it may be directly connected or coupled to the other element but another element may also be interposed therebetween. On the other hand, when an element is referred to as being "directly connected" or "directly coupled" to another element, it should be understood that there are no other elements in between.

The terms used herein are used only to describe specific embodiments, and are not intended to limit the present invention. The singular forms "a," "an," and "the" include plural referents unless the context clearly dictates otherwise. In this disclosure, the terms "include," "comprise," or "have" specify features, numbers, steps, operations, elements or combinations thereof, but do not exclude existence or addition possibility of one or more other features, numbers, steps, operations, elements or combinations thereof.

Unless described otherwise, all terms used herein including technical or scientific terms may include the same meaning as those generally understood by persons skilled in the art to which the present invention belongs. Terms as defined in dictionaries generally used should be construed as including meanings which accord with the contextual meanings of related technology. Also, unless clearly defined in this disclosure, the terms should not be construed as having ideal or excessively formal meanings.

Hereinafter, exemplary embodiments of the present invention will be described in detail with reference to the accompanying drawings.

In order to help the overall understanding of the present disclosure, the same reference numerals will be used for the same elements in the drawings, and a duplicate description of the same elements will be omitted.

As described above, according to the operation of a typical DCF in a network in which a plurality of terminals are connected to one AP, each of the plurality of terminals intending to transmit data to the AP sets a random back-off value. When the channel is empty for each time slot, the back-off value is decreased by 1 and data is transmitted if the back-off value reaches 0. However, in this typical contention-based DCF operation, there is a limitation in that a specific terminal among a plurality of terminals may have a significantly longer response delay than other terminals due to a collision between terminals whose back-off values reach 0 at the same time.

In order to overcome this limitation occurring in the DCF scheme, a Carrier Sense Multiple Access with Enhanced Collision Avoidance (CSMA/ECA) protocol may be considered as a method for reducing collision. The CSMA/ECA protocol senses the channel state before data transmission, and sets a random back-off value when the channel is empty and transmits data, which is the same as the DCF method. However, a terminal successful in data transmission uses a Deterministic Back-off ($B_d$) value, and when all terminals are successful in data transmission, all the terminal can transmit data without a collision in a stable state. However, if more number of terminals than the deterministic back-off value are connected to the system, the stable state cannot be reached, and thus a collision occurs like DCF. Since the deterministic back-off value is calculated based on the contention window value initially set in the network, it is difficult to actively deal with the change in the number of terminals participating in the network. There is still a limitation in that the response delay time becomes long even when the terminal that succeeds in data transmission determines a deterministic back-off value based on the back-off contention window value increased by the binary exponential back-off algorithm.

The exemplary embodiments of the present invention enable autonomous scheduling of collision-free data transmission according to the number of terminals connected to a network, for example, in a network in which a plurality of terminals are connected to an AP, such as a wireless local area network environment, thereby maintaining the transmission delay of each terminal constant and enabling flexible data transmission according to the energy state.

That is, exemplary embodiments of the present invention enable autonomous data collision avoidance scheduling through assistance of Access Points (APs) between wireless terminals capable of energy harvesting, for example, in a Wireless Local Area Network (WLAN). More specifically, when there is a change in the number of terminals based on the information of the number of terminals connected to the network, the AP may newly calculate an appropriate contention window (CW) size capable of preventing collision, and the information on the calculated contention window size may be may be transmitted to a terminal successful in the data transmission through an Acknowledgment (ACK) frame received by each terminal after the data transmission. The terminal may newly calculate a deterministic back-off ($B_d$) based on the CW value received from the AP to attempt a next data transmission. For this, an extended ACK frame that was not present in the existing IEEE 802.11 may be used. In order for the AP and the terminal to differentiate from the existing IEEE 802.11 standard protocol, the protocol version field value of the Medium Access Control (MAC) header may be allowed to have a value different from the standard, and thus each terminal may be allowed to check the CW value from the ACK frame received after the data transmission and adaptively select the $B_d$ value with respect to the CW to attempt the next data transmission.

Figure 2:
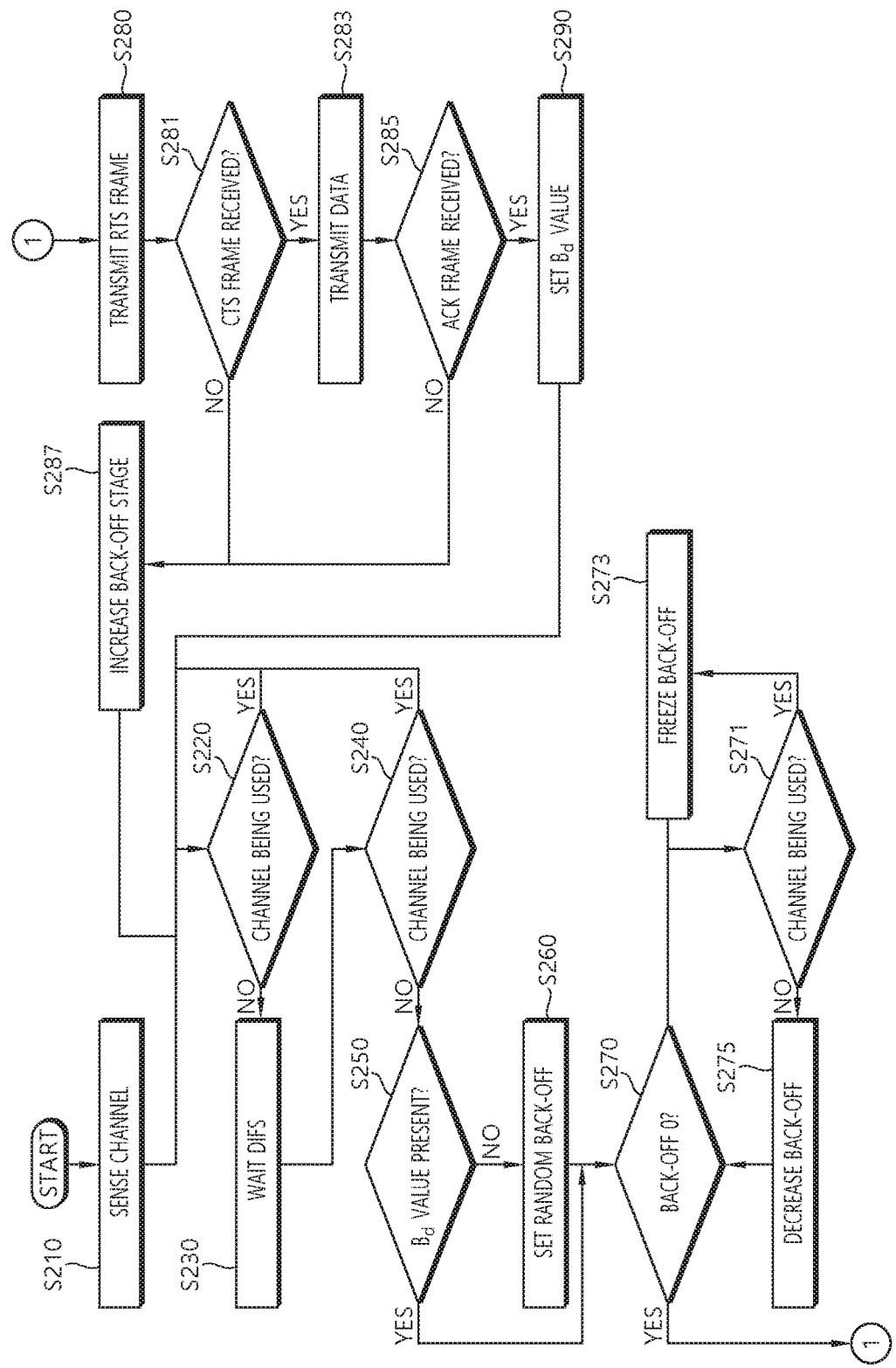
FIG. 2 is a flowchart illustrating an operation of a data transmission protocol according to an embodiment of the present invention.

FIG. 2 is a flowchart illustrating an operation of a data transmission protocol according to an embodiment of the present invention.

Hereinafter, the operation of the data transmission protocol according to an embodiment of the present invention will be described in more detail with reference to FIG. 2.

First, a network configuration according to an embodiment of the present invention may be configured with a single AP and a plurality of terminals capable of energy harvesting, and it will be assumed that all terminals always have data to be transmitted to the AP.

The AP that knows information on the number of terminals connected to the system can calculate the CW value (W) based on the number (N) of currently connected terminals whenever there is a change in the number of connected terminals. For example, the number of connected terminals may be multiplied by a system stabilization constant k, and then the minimum value among even integers greater than the value may be calculated as the W value as shown in Equation 1 below.

$$W = \begin{cases} kN & (kN \text{ is even number}) \\ kN + 1, & (kN \text{ is odd number}) \end{cases} \quad [\text{Equation 1}]$$

That is, if a value obtained by multiplying the number of connected terminals by the stabilization constant k is an even number, kN may be calculated as the W value. If the value obtained by multiplying the number of connected terminals by the stabilization constant k is an odd number, 1 may be added to kN to calculate the W value that is an even number.

Here, as the system stabilization constant value k is selected as a larger value, the time taken to reach the stabilization state is shortened even if there is a change in the number of terminals of the system, and as the value k becomes smaller, the time taken to reach the stabilization state may become longer. In order to ensure collision avoidance scheduling of all terminals, the value k needs to be equal to or greater than at least 2.

Figure 3:
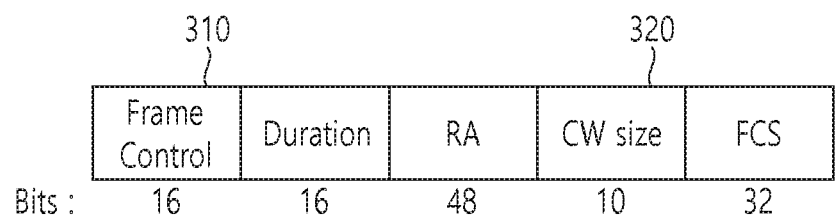
FIG. 3 is view illustrating an exemplary configuration of an extended ACK frame.

The W value calculated in the AP may be transmitted through an ACK frame received after the terminals perform data transmission. Also, according to an embodiment of the present invention, an extended ACK frame in which a CW field is added to the ACK frame used in the existing IEEE 802.11 standard protocol may be used. FIG. 3 shows an ACK frame in which a CW field 320 is added to an existing ACK frame according to an embodiment of the present invention. On the other hand, FIG. 4 is a view illustrating a detailed configuration of a frame control field 310 of FIG. 3. Since a protocol according to an embodiment of the present invention uses an extended ACK frame that is absent in the existing IEEE 802.11, in order to distinguish from the IEEE 802.11 standard protocol, the value of a protocol version field 311 of a MAC header shown in FIG. 4 is set to 10(2) and the like, which is different from 00(2) used in the standard protocol. When the AP receives a packet transmitted from the terminal and the protocol version of the MAC header is 10(2), it may be determined that the protocol follows the data transmission protocol according to an embodiment of the present invention.

Referring to FIG. 2, the data transmission of each terminal basically follows DCF of the IEEE 802.11 standard. Each terminal first senses the channel in step S210 and checks whether the channel is used before attempting data transmission in step S220. If terminal waits for DIFS time in step S230 and then the channel is empty in step S240, it is determined whether a deterministic back-off value ($B_d$) is present in step S250. If there is no deterministic back-off value, a random back-off value is set within a range of [0, CW-1] in step S260. If the channel is empty every unit slot time, the back-off value is decreased. That is, before the back-off value is decreased to 0 in step S270, the terminal determines whether the channel is in use in step S271. If the channel is being used, the decrease of the back-off is frozen in step S273, and if the channel is not used, the back-off value is decreased in step S275, thereby allowing the back-off value to be decreased to 0.

The terminal whose back-off value is decreased to 0 in step S270 transmits an RTS frame to the AP in step S280. If the AP successfully receives the RTS frame transmitted from the terminal, the terminal receives a CTS frame by transmitting the CTS frame in step S281, and the transmitting terminal that attempts to transmit data knows that data transmission to the AP is possible. When the other terminals receive the RTS frame and the CTS frame, the back-off decrease is stopped until the data transmission completion time, and the terminals wait until the channel is empty.

After the RTS frame is transmitted, the terminal that normally receives the CTS frame in step S281 attempts to transmit data in step S283. When the data transmission is successfully completed, the AP transmits an ACK frame to inform the successful data transmission. If the CTS frame in step S281 or the ACK frame in step S285 is not received from the AP, the terminal determines that a collision with another terminal occurs, doubles the back-off stage value (W value) in step S287, and resets the random back-off value within the range of [0, W-1] to attempt the RTS transmission. The above procedure is repeated up to a maximum back-off stage m determined in the system. After the back-off stage reaches the maximum stage, the maximum stage m is maintained, and the random back-off value is set within the range of [0, W-1] to attempt the data transmission.

If the terminal succeeds in data transmission, the $B_d$ value may be calculated using the W value delivered through the ACK frame received from the AP in step S285. At this time, the deterministic back-off value $B_d$ may be determined by dividing the W value by 2 as shown in the following Equation 2.

$$B_d = W/2 \qquad \text{[Equation 2]}$$

In a stable state where all terminals successfully transmit data, each terminal may sequentially transmit data without a collision. As shown in FIG. 2, in a data transmission algorithm according to an exemplary embodiment of the present invention, a terminal that does not receive the ACK frame sets a random back-off value in step S260. A terminal that succeeds in data transmission and receives the ACK frame may set a $B_d$ value in step S290, and may decrease the back-off value using the deterministic back-off value in step S250 until the back-off value becomes 0.

On the other hand, when the energy of a specific terminal is smaller than a reference, the terminal itself may reduce the consumed energy by increasing the data transmission period. Upon calculation of the $B_d$ value, if the $B_d$ value is determined by multiplying a power saving coefficient r as shown in Equation 3 below, a specific terminal may transmit data once when other terminals transmit data r times. Also in this process, since the data transmission of other terminals is not affected, flexible data transmission is possible.

$$B_d = rW/2 \qquad \text{[Equation 3]}$$

Figure 5:
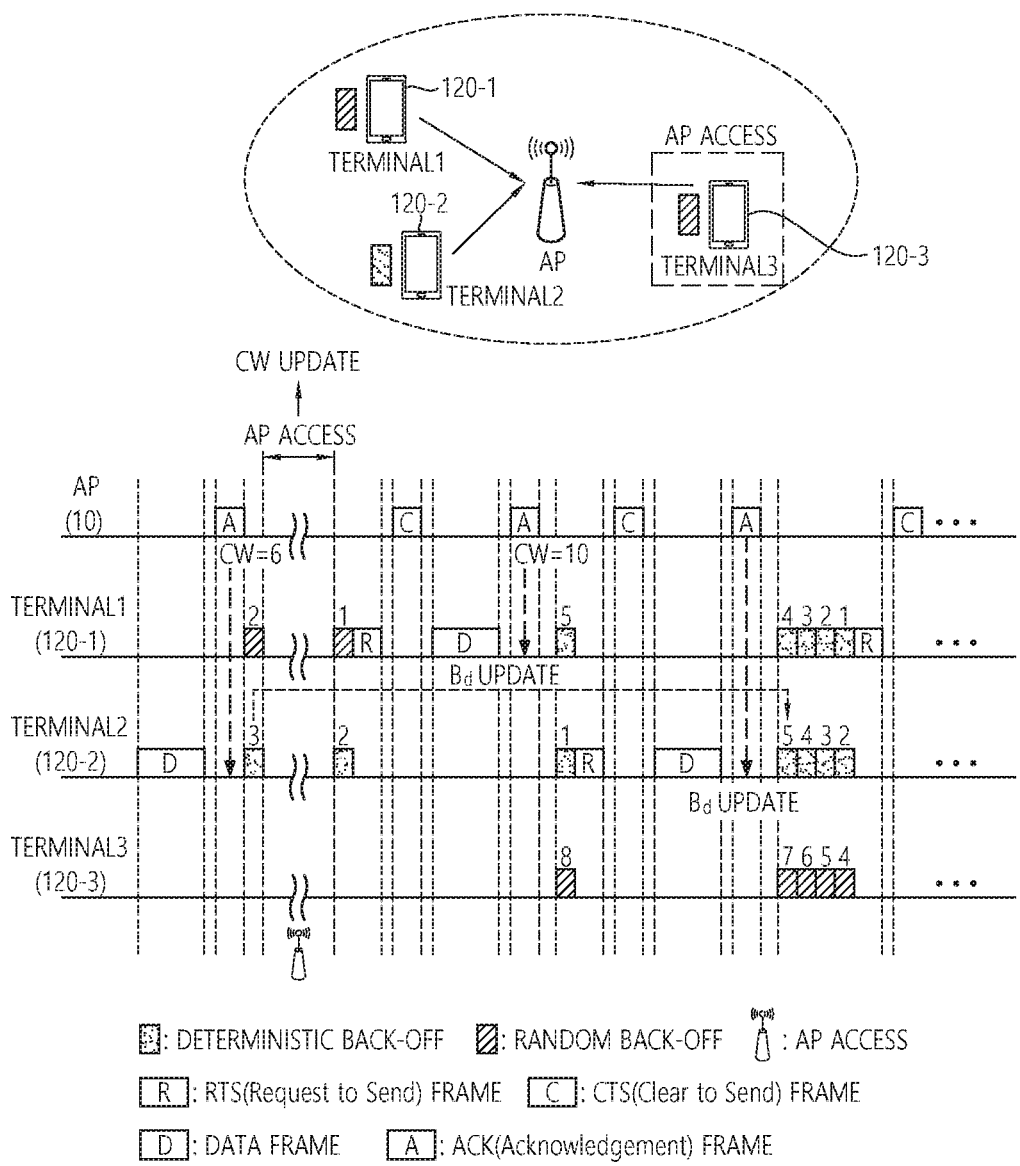
FIG. 5 is a view illustrating an example of operation according to a data transmission protocol according to an embodiment of the present invention.

FIG. 5 is a view illustrating an example of operation according to a data transmission protocol according to an embodiment of the present invention. In the example shown in FIG. 5, a network system includes one AP 10 and three terminals 120-1, 120-2 and 120-3. Here, the system stabilization constant k is set to 3. When two terminals 120-1 and 120-2 (N=2) are connected, the AP may calculate as W=kN=6, and each terminal may calculate the $B_d$ value as $B_d$=3. When the second terminal 120-2 succeeds in data transmission and receives an ACK frame from the AP 10, the second terminal 120-2 attempts data transmission by setting the calculated $B_d$ value to the next back-off value. At this time, when the third terminal 120-3 is newly connected to the AP 10 and N is changed to 3 (N=3), the AP 10 newly changes W to 10 (W=kN+1=10). The changed W value is transmitted through the ACK frame to the terminals that succeed in transmission. After success in data transmission, the first terminal 120-1 may change the $B_d$ value to $B_d$=5 through the value of W=10 received through the changed ACK frame to attempt the next data transmission. If all the terminals 120-1, 120-2 and 120-3 succeed in data transmission through the above procedure, the terminals may perform scheduling for sequentially transmitting data in the order of the first to third terminals 120-2, 120-1 and 120-3 without collision and help of the AP.

Figure 6:
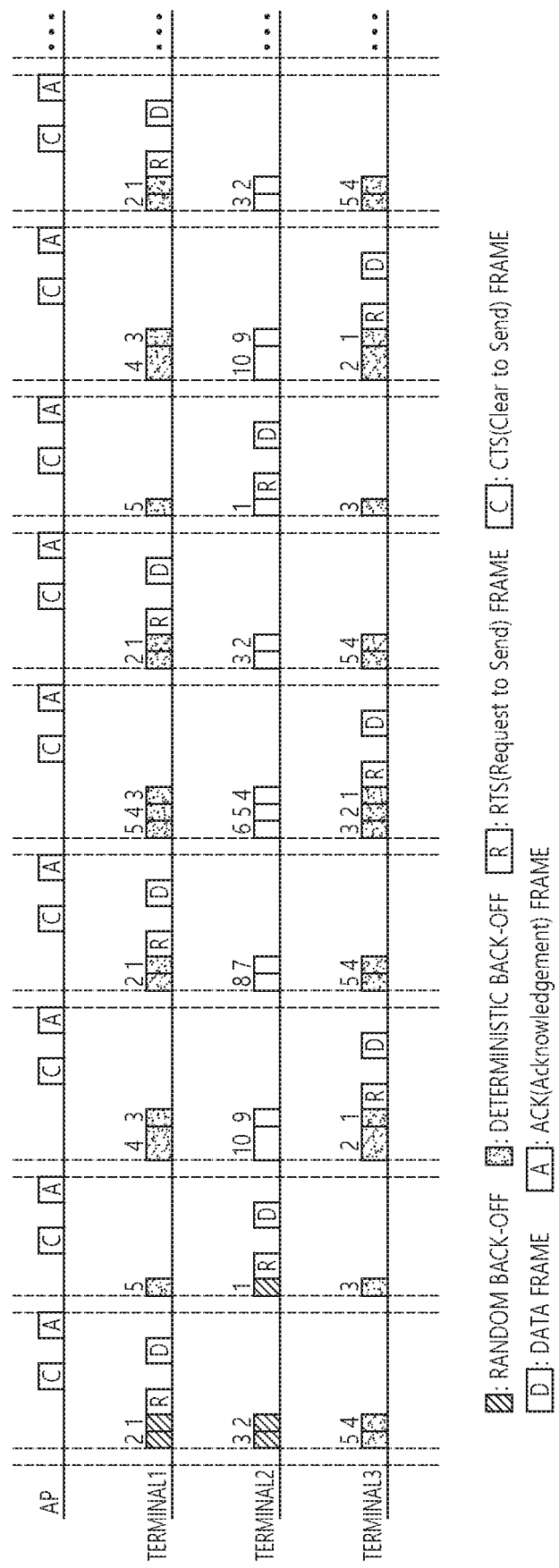
FIG. 6 is a view illustrating an example of a period change in a data transmission protocol according to an embodiment of the present invention.

FIG. 6 is a view illustrating an example of a period change in a data transmission protocol according to an embodiment of the present invention. That is, FIG. 6 shows an example in which a terminal having a low energy state among the terminals connected to the AP changes the transmission period, and indicates that the channel is not empty due to data transmission. In a network to which three terminals are connected, W=kN+1=10 is calculated, and $B_d$=5 is calculated for data transmission. If the energy of the second terminal is less than a reference value and the second terminal desires to double its data transmission period by itself compared to the other terminals, then the $B_d$ value may be set to $B_d$=2 W/2=10 after the data transmission is successful. Thus, when the first and third terminals transmit data twice, the second terminal may transmit data once. Also in this case, it may be confirmed that there is no collision with the second terminal and the third terminal.

Figure 7:
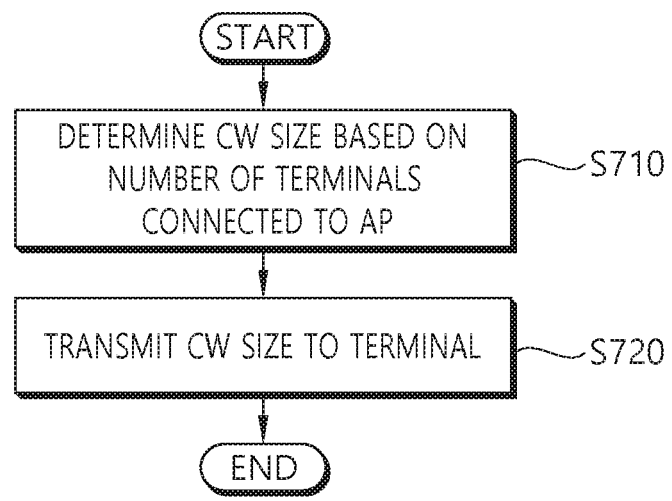
FIG. 7 is a flowchart illustrating a method for scheduling contention-based data transmission in a network system according to an embodiment of the present invention.

FIG. 7 is a flowchart illustrating a method for scheduling contention-based data transmission in a network system according to an embodiment of the present invention. Hereinafter, a method for scheduling contention-based data transmission in a network system including an access point (AP) and a plurality of terminals according to an embodiment of the present invention will be described in more detail with reference to FIG. 7.

As shown in FIG. 7, a method according to an embodiment of the present invention may first determine the size of a contention window (CW) based on the number of terminals connected to the access point in step S710. As described above in regard to the data transmission protocol according to an embodiment of the present invention, in determining the contention window size based on the number of terminals connected to the access point, whenever the number of terminals connected to the access point is changed, the contention window size may be allowed to be updated Here, the contention window size may be determined as a positive integer that is a minimum even number that is greater than or equal to a value obtained by multiplying the number of terminals connected to the access point by the system stabilization constant k, and the system stabilization constant k may be set to be greater than or equal to 2 for the contention avoidance scheduling of all terminals connected to the access point.

When the size of the contention window is determined, information about the size of the contention window may be transmitted to any one of a plurality of terminals participating in the network in step S720. When transmitted to any one of the terminals, the information about the contention window size transmitted to the terminal may be used to determine a deterministic back-off value ($B_d$) of any one of the plurality of terminals. As described above in regard to the data transmission protocol, the information about the contention window size may be transmitted through the ACK frame indicating that data have been successfully transmitted from any one of the plurality of terminals to the access point. Accordingly, a terminal that succeeds in data transmission with a random back-off value through a typical contention DCF scheme receives information on the updated contention window size based on the number of terminals participating in the current network to determine the deterministic back-off value. Here, the deterministic back-off value of any one of the plurality of terminals may be determined as a value obtained by dividing the contention window size by 2.

As described based on FIGS. 3 and 4, the ACK frame may include the Contention Window (CW) field 320 and the frame control field 310. The protocol version field 311 included in the frame control field 310 may include information indicating that the deterministic back-off value based on the number of terminals is used.

On the other hand, as described above with reference to FIG. 6, when the energy state of any one of the plurality of terminals is lower than a predetermined threshold, any one of the plurality of terminals may multiply the deterministic back-off value by a predetermined power saving coefficient r to increase the data transmission period.

Figure 8:
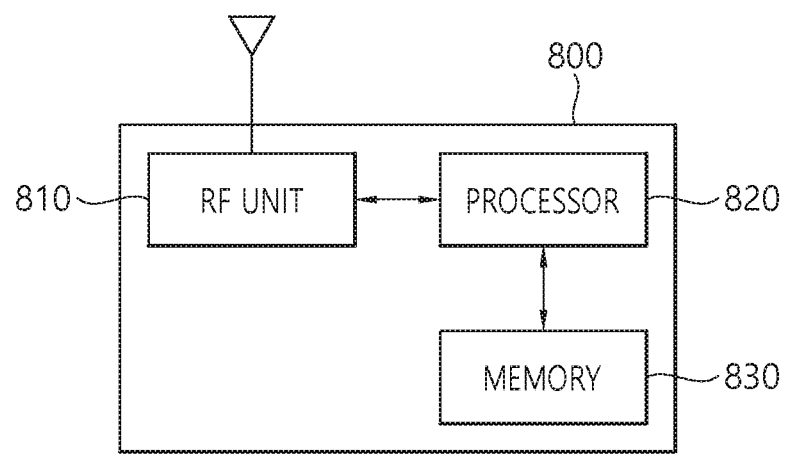
FIG. 8 is a view illustrating a configuration of an apparatus for scheduling contention-based data transmission in a network system according to an embodiment of the present invention.

FIG. 8 is a view illustrating a configuration of an apparatus for scheduling contention-based data transmission in a network system according to an embodiment of the present invention. As shown in FIG. 8, an apparatus 800 for scheduling contention-based data transmission in a network system including an access point (AP) and a plurality of terminals according to an embodiment of the present invention may include an RF unit 810, a processor 820, and a memory 830.

The processor 820 may be configured to determine the size of a contention window (CW) based on the number of terminals connected to the access point, and transmit information on the contention window size through the RF unit 810 to any one of a plurality of terminals. Also, the transmitted information on the contention window size may be used to determine a deterministic back-off value ($B_d$) of any one of the plurality of terminals.

In addition, instructions that are configured to allow the processor 820 to schedule contention-based data transmission of a network system may be stored in the memory 830. A more specific operation of the apparatus for scheduling contention-based data transmission in a network system according to an embodiment of the present invention may follow the data transmission scheduling method according to an embodiment of the present invention described above.

Figure 9:
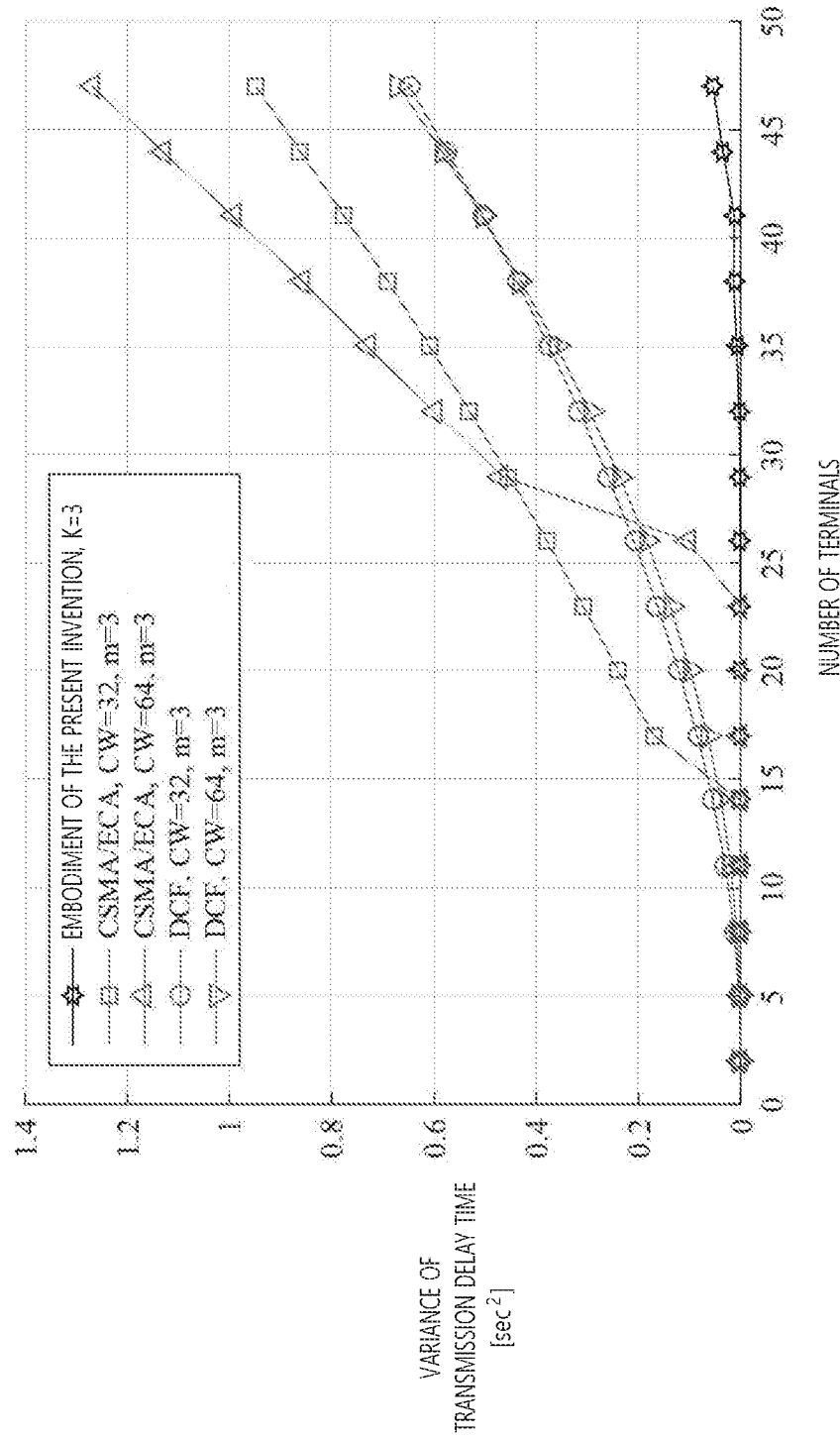
FIG. 9 is a graph illustrating a performance evaluation result according to variance of transmission delay time.

FIG. 9 is a graph illustrating a performance evaluation result according to variance of transmission delay time. In FIG. 9, in order to compare related-arts (an existing DCF method of always setting an random back-off value and transmitting data and a CSMA/ECA protocol of transmitting data with a deterministic back-off value set for the first time in the system) with the performance of exemplary embodiments of the present invention that adaptively changes the deterministic back-off value according to the number of terminals, the variance value of the transmission delay time of each terminal was measured through a simulation while changing the number of terminals connected to the system. The transmission delay time means a time between the success of the data transmission to the AP and the success of the next data transmission by each terminal. FIG. 9 shows a result of the variance value of the transmission delay time according to a change in the number of terminals. In the DCF scheme, as the number of terminals increases, collisions occur more frequently, and the transmission time interval is not uniform and variance also increases continuously. In the case of CSMA/ECA, when the number of terminals is smaller than a $B_d$ value initially set in the system, the variance approximates to 0 because there is no collision. However, when the number of terminals is larger than the $B_d$ value, it can be seen that the variance value is larger than that of the existing DCF.

Since the transmission protocol according to an embodiment of the present invention can transmit data without a collision even in a network environment having a large number of terminals such as Internet of Things (IoT) environment, and can transmit and receive data packets at a constant time interval, the transmission protocol can be utilized in an application scenario that transmits multimedia streams sensitive to the delay time variance, and can adjust the transmission period according to the energy state of each terminal by itself.

The method of scheduling contention-based data transmission in the network system according to an embodiment of the present invention can be implemented as computer-readable code on a computer-readable recording medium. The computer-readable recording medium includes all kinds of recording media storing data which can be interpreted by a computer system. For example, the computer-readable recording medium may include a Read Only Memory (ROM), a Random Access Memory (RAM), a magnetic tape, a magnetic disk, a flash memory, an optical data storage device, and the like. In addition, the computer-readable recording medium may be distributed in computer systems connected to a computer network, and may be stored and executed as a code readable in a distribution manner.

While the present invention has been described with reference to the accompanying drawings and exemplary embodiments, it is to be understood that the invention is not limited by the accompanying drawings and embodiments. It will be understood by those skilled in the art that various changes in form and details may be made therein without departing from the spirit and scope of the invention as defined by the appended claims.

In particular, the described features may be implemented within digital electronic circuitry, or computer hardware, firmware, or combinations thereof. The features may be implemented in a computer program product embodied in a storage device in a machine-readable storage device, for example, for execution by a programmable processor. Also, the features may be performed by a programmable processor executing a program of instructions for performing functions of the described embodiments, by operating on input data and generating an output. The described features may be implemented in at least one computer programs that can be executed on a programmable system including at least one programmable processor, at least one input device, and at least one output device which are combined to receive data and directives from a data storage system and to transmit data and directives to the data storage system. A computer program includes a set of directives that can be used directly or indirectly within a computer to perform a particular operation on a certain result. A computer program may be written in any form of programming language including compiled or interpreted languages, and may be used in any form included as modules, elements, subroutines, or other units suitable for use in other computer environments or independently operable programs.

Suitable processors for execution of the program of directives include, for example, both general-purpose and special-purpose microprocessors, and a single processor or one of multiple processors of other type of computer. In addition, storage devices suitable for implementing the computer program directives and data implementing the described features include, for example, semiconductor memory devices such as EPROM, EEPROM, and flash memory devices, magnetic devices such as internal hard disks and removable disks, magneto-optical disks, and all forms of nonvolatile memories including CD-ROM and DVD-ROM disks. The processor and memory may be integrated within Application-Specific Integrated Circuits (ASICs) or added by ASICs.

While the present invention has been described on the basis of a series of functional blocks, it is not limited by the embodiments described above and the accompanying drawings, and it will be apparent to those skilled in the art that various substitutions, modifications and variations can be made without departing from the scope of the present invention.

The combination of the above-described embodiments is not limited to the above-described embodiments, and various forms of combination in addition to the above-described embodiments may be provided according to implementation and/or necessity.

In the above-described embodiments, the methods are described on the basis of a flowchart as a series of operations or blocks, but the present invention is not limited to the order of the operations, and some operations may occur in different orders or at the same time unlike those described above. It will also be understood by those skilled in the art that the operations shown in the flowchart are not exclusive, and other operations may be included, or one or more operations in the flowchart may be omitted without affecting the scope of the present invention.

The above-described embodiments include examples of various aspects. While it is not possible to describe every possible combination for expressing various aspects, one of ordinary skill in the art will recognize that other combinations are possible. Accordingly, it is intended that the present invention include all alternatives, modifications and variations that fall within the scope of the following claims.

The disclosed technology may have the following effects. However, since it is not meant that a particular embodiment should include all of the following effects or include only the following effects, the scope of the disclosed technology should not be construed as being limited by the following effects.

According to the method and apparatus for scheduling contention-based data transmission according to an embodiment of the present invention, in a network environment employing contention-based data transmission, the terminals themselves can perform data transmission scheduling without collision according to the number of terminals connected to the network, thereby maintaining the transmission delay of each of the terminals constant and performing flexible data transmission according to the energy state.

That is, according to an embodiment of the present invention, when wireless terminals receive data with assistance of AP, the wireless terminals adaptively select a value with respect to a contention window value, and when all terminals succeed in transmission once, each terminal can perform data transmission without colliding with each other. In addition, when the residual energy of the terminal is small, the terminal itself can adjust the energy consumption by adjusting the transmission period. Even in this process, since the data transmission of other terminals is not affected, flexible data transmission is possible.

What is claimed is:

1. A method for scheduling contention-based data transmission in a network system comprising an access point (AP) and a plurality of terminals, the method comprising:
    determining a contention window (CW) size based on a number of terminals connected to the access point; and
    transmitting information about the contention window size to any one of the plurality of terminals through an acknowledgment (ACK) frame configured to be transmitted in response to data from any one of the plurality of terminals being received by the AP, the transmitted information including information indicating that a deterministic back-off value based on the number of terminals is used.

2. The method of claim 1, wherein the transmitted information on the contention window size is used to determine a respective deterministic back-off value ($B_d$) of any one of the plurality of terminals.

3. The method of claim 1, wherein the ACK frame indicates that data are successfully transmitted from any one of the plurality of terminals to the access point.

4. The method of claim 3, wherein the ACK frame comprises a contention window (CW) field, and
wherein the ACK frame comprises a frame control field, and a protocol version field comprised in the frame control field comprises the information indicating that the deterministic back-off value based on the number of terminals is used.

5. The method of claim 1, wherein the contention window size is determined as a positive integer that is a minimum even number greater than or equal to a value obtained by multiplying the number of terminals connected to the access point by a system stabilization constant.

6. The method of claim 5, wherein the system stabilization constant is set to be greater than or equal to 2 for collision avoidance scheduling of all terminals connected to the access point.

7. The method according to claim 1, wherein the determining of the contention window size comprises updating the contention window size whenever the number of terminals connected to the access point is changed.

8. The method of claim 2, wherein the deterministic back-off value of any one of the plurality of terminals is determined as a value obtained by dividing the contention window size by 2.

9. A method for scheduling contention-based data transmission in a network system comprising an access point (AP) and a plurality of terminals, the method comprising:
determining a contention window (CW) size based on a number of terminals connected to the access point; and
transmitting information about the contention window size to any one of the plurality of terminals through an acknowledgment (ACK) frame configured to be transmitted in response to data from any one of the plurality of terminals being received by the AP,
wherein the transmitted information on the contention window size is for determining a deterministic back-off value ($B_d$) of any one of the plurality of terminals, and for, when an energy state of any one of the plurality of terminals is lower than a predetermined threshold, any one of the plurality of terminals to increases a data transmission period by multiplying the deterministic back-off value by a predetermined power saving coefficient.

10. An apparatus for scheduling contention-based data transmission in a network system comprising an access point (AP) and a plurality of terminals, the apparatus comprising a processor and an RF unit, wherein the processor is configured to:
determine a contention window (CW) size based on a number of terminals connected to the access point, and
transmit information on the contention window size to any one of the plurality of terminals through an acknowledgment (ACK) frame configured to be transmitted in response to data from any one of the plurality of terminals being received by the AP,
wherein the ACK frame comprises a field that comprises information indicating that a deterministic back-off value ($B_d$) based on the number of terminals is used.

11. The apparatus of claim 10, wherein the transmitted information on the contention window size is used to determine a respective deterministic back-off value ($B_d$) of any one of the plurality of terminals.

12. The apparatus of claim 10, wherein the ACK frame indicates that data are successfully transmitted from any one of the plurality of terminals to the access point.

13. The apparatus of claim 10, wherein the ACK frame comprises a contention window (CW) field, and
wherein the ACK frame comprises a frame control field, and a protocol version field comprised in the frame control field that comprises the information indicating that the deterministic back-off value based on the number of terminals is used.

14. The apparatus of claim 10, wherein the contention window size is determined as a positive integer that is a minimum even number greater than or equal to a value obtained by multiplying the number of terminals connected to the access point by a system stabilization constant.

15. The apparatus of claim 14, wherein the system stabilization constant is set to be greater than or equal to 2 for collision avoidance scheduling of all terminals connected to the access point.

16. The apparatus of claim 10, wherein the determining of the contention window size comprises updating the contention window size whenever the number of terminals connected to the access point is changed.

17. The apparatus of claim 10, wherein the apparatus for scheduling contention-based data transmission is configured as a part of the access point.

18. A network system for performing contention-based data transmission, the network system comprising an access point (AP) and a plurality of terminals,
wherein the access point is configured to:
determine a contention window size based on a number of terminals connected to the access point, and
transmit information on the contention window size to any one of the plurality of terminals through an acknowledgment (ACK) frame configured to be transmitted in response to data from any one of the plurality of terminals being received by the AP, and
wherein the ACK frame comprises information indicating that a deterministic back-off value based on the number of terminals is to be used, for any one of the plurality of terminals to determine a corresponding deterministic back-off value ($B_d$) of any one of the plurality of terminals based on the transmitted information on the contention window size.

19. The method of claim 9, wherein the ACK frame indicates that data are successfully transmitted from any one of the plurality of terminals to the access point, with the ACK frame comprising a contention window (CW) field and a frame control field, the frame control field comprising a protocol version field that includes information indicating that a deterministic back-off value based on the number of terminals is to be used.

20. The method of claim 9, wherein the contention window size is determined as a positive integer that is a minimum even number greater than or equal to a value obtained by multiplying the number of terminals connected to the access point by a system stabilization constant.

21. The method of claim 20, wherein the system stabilization constant is set to be greater than or equal to 2 for collision avoidance scheduling of all terminals connected to the access point.

22. The method of claim 9, wherein the determining of the contention window size comprises updating the contention window size whenever the number of terminals connected to the access point is changed.

23. The method of claim 9, wherein a deterministic back-off value of the any one of the plurality of terminals is determined as a value obtained by dividing the contention window size by 2.

* * * * *